(12) United States Patent
Bryan

(10) Patent No.: US 7,284,630 B2
(45) Date of Patent: Oct. 23, 2007

(54) KIT AND METHOD FOR HIGH CLEARANCE CONVERSION OF A VEHICLE

(75) Inventor: David Bryan, Riverhurst (CA)

(73) Assignee: Spray Monsters Manufacturing Inc., Moose Jaw (CA)

( * ) Notice: Subject to any disclaimer, the term of this patent is extended or adjusted under 35 U.S.C. 154(b) by 520 days.

(21) Appl. No.: 10/866,610

(22) Filed: Jun. 14, 2004

(65) Prior Publication Data

US 2004/0238658 A1    Dec. 2, 2004

(51) Int. Cl.
   *B60P 3/06*  (2006.01)
(52) U.S. Cl. .......................... 180/198; 280/43
(58) Field of Classification Search ............... 180/198, 180/209, 340; 280/80.1, 43, 86.75, 149.1, 280/6.15, 6.155; 239/159
   See application file for complete search history.

(56) References Cited

U.S. PATENT DOCUMENTS

| | | | | |
|---|---|---|---|---|
| 2,190,091 A | * | 2/1940 | Wolfe | .................. 301/132 |
| 2,532,076 A | * | 11/1950 | Raney et al. | .................. 280/43 |
| 2,811,368 A | * | 10/1957 | Clausen | .................. 280/43 |
| 5,046,579 A | * | 9/1991 | Anderson | .................. 180/340 |
| 5,072,805 A | | 12/1991 | Meiners | |
| 6,021,861 A | * | 2/2000 | Dickson | .................. 180/198 |
| 6,257,361 B1 | | 7/2001 | Dickson | |

* cited by examiner

*Primary Examiner*—Paul N. Dickson
*Assistant Examiner*—Tiffany L. Webb
(74) *Attorney, Agent, or Firm*—Ryan W. Dupuis; Adrian D. Battison; Michael R. Williams

(57) ABSTRACT

A kit and method are provided for conversion of a vehicle to a high clearance vehicle. The method includes supporting the rear end of the vehicle in a raised position by providing replacement rear wheels of larger diameter. A lifting bracket associated with each front wheel includes a socket for receiving the existing wheel spindle of the respective front wheel therein and a replacement wheel spindle lying parallel and spaced below the socket for supporting the respective front wheel thereon. The use of lifting brackets mounted on the existing wheel spindles of the vehicle permits the existing steering linkage and suspension of the vehicle to function normally so that minimal modification to the vehicle is required for conversion to high clearance.

20 Claims, 4 Drawing Sheets

KIT AND METHOD FOR HIGH CLEARANCE CONVERSION OF A VEHICLE

FIELD OF THE INVENTION

The present invention relates to a kit and method of use thereof for converting a road vehicle into a high clearance vehicle, for example for use as an agricultural sprayer.

BACKGROUND

Spraying is well known in various agricultural applications and generally involves specialized high clearance equipment for being driven through fields with minimal crop damage. Such specialized high clearance sprayers however are limited in use and accordingly are costly to use. Various attempts have been made for converting small trucks into a high clearance vehicle as described and illustrated in U.S. Pat. No. 5,072,805 to Meiners and U.S. Pat. No. 6,257,361 to Dickson. In each instance however a large secondary frame is required for supporting the vehicle thereon with special consideration being required for proper suspension of the vehicle. Special consideration is also required in the form of additional steering linkages.

SUMMARY

According to one aspect of the present invention there is provided a kit for high clearance conversion of a vehicle supported on the ground at a rear end on existing rear wheels and supported at a front end on existing front steerable wheels, each front steerable wheel being supported on an existing wheel spindle of the vehicle and each rear wheel being supported on an existing wheel hub of the vehicle, the kit comprising:

a rear lifting device for supporting the rear end of the vehicle in a raised position in relation to being supported on the existing rear wheels on the respective existing wheel hubs; and a lifting bracket associated with each front steerable wheel, the lifting bracket including a socket for receiving the existing wheel spindle of the respective front steerable wheel therein and a replacement wheel spindle lying parallel and spaced below the socket for supporting the respective front steerable wheel thereon.

The use of lifting brackets mounted on the existing wheel spindles of the vehicle permits the existing steering linkage and suspension of the vehicle to function normally so that minimal modification to the vehicle is required for conversion to high clearance.

The replacement wheel spindle of each lifting bracket is preferably spaced outwardly in an axial direction of the replacement wheel spindle from the respective socket to permit a replacement wheel of larger diameter to be supported on the replacement wheel spindle while still providing sufficient clearance within the wheel well of the vehicle for steering.

The kit may include replacement front wheels which are larger in diameter than the existing front steerable wheels for mounting on the respective replacement wheel spindles.

The rear lifting device may include replacement rear wheels which are larger in diameter than the replacement front wheels for mounting on the respective existing wheel hubs of the vehicle. Alternatively, any other conventional technique for raising the suspension and position of the rear wheels relative to the vehicle frame may be used for lifting the rear end to match the lifting provided by the lifting brackets at the front end of the vehicle.

The replacement rear wheels are preferably arranged for direct coupling to the respective existing wheel hubs for concentric mounting of the replacement rear wheels on the existing wheel hubs.

The replacement rear wheels preferably each include a hub mount spaced inwardly in an axial direction of the respective replacement rear wheel in which the wheel rim forms the hub mount integrally thereon so that the replacement rear wheels and the replacement front wheels follow a common drive path.

According to a further aspect of the present invention there is provided a method for conversion of a vehicle to a high clearance vehicle, the vehicle being supported on the ground at a rear end on existing rear wheels and supported at a front end on existing front steerable wheels, each front steerable wheel being supported on an existing wheel spindle of the vehicle and each rear wheel being supported on an existing wheel hub of the vehicle, the method comprising:

supporting the rear end of the vehicle in a raised position in relation to being supported on the existing rear wheels on the respective existing wheel hubs;

providing a lifting bracket associated with each front steerable wheel, the lifting bracket including a socket for receiving the existing wheel spindle of the respective front steerable wheel therein and a replacement wheel spindle lying parallel and spaced below the socket for supporting the respective front steerable wheel thereon;

mounting each socket on the respective existing wheel spindle;

mounting a front wheel on each replacement wheel spindle for rotation about a respective wheel axis lying parallel and spaced below the respective existing wheel spindle.

The method accordingly may include providing replacement front wheels which are larger in diameter than the existing front steerable wheels for mounting on the respective replacement wheel spindles.

Additional steps of the method may include i) supporting the rear end of the vehicle in a raised position by providing replacement rear wheels which are larger in diameter than the replacement front wheels and the existing rear wheels for mounting on the respective existing wheel hubs of the vehicle; and ii) coupling the replacement rear wheels concentrically on the existing wheel hubs.

The kit and method of use disclosed herein are particularly useful for conversion of a conventional highway truck tractor to an agricultural sprayer by supporting a boom with sprayer nozzles spaced thereon on the vehicle, with a tank and pump as required for supplying the sprayer nozzles.

When the kit and method are used with a truck tractor in which the existing rear wheels are tandem rear wheels, a frame extension may be used for extending the frame between the existing rear wheels, along with a drive extension for extending the distance between the differentials of the tandem rear axles respectively. Replacement rear wheels which are larger in diameter than the existing rear wheels can thus be used without interference between the tandem wheels after conversion to a high clearance vehicle.

BRIEF DESCRIPTION OF THE DRAWINGS

In the accompanying drawings, which illustrate exemplary embodiments of the present invention.

DETAILED DESCRIPTION

Figure 1:
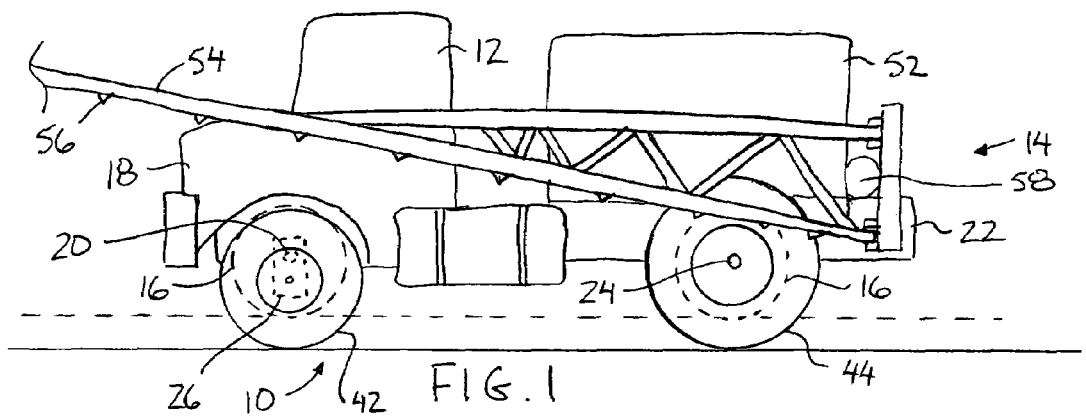
FIG. 1 is a side elevational view of the high clearance conversion kit shown mounted on a highway truck tractor.
Figure 2:
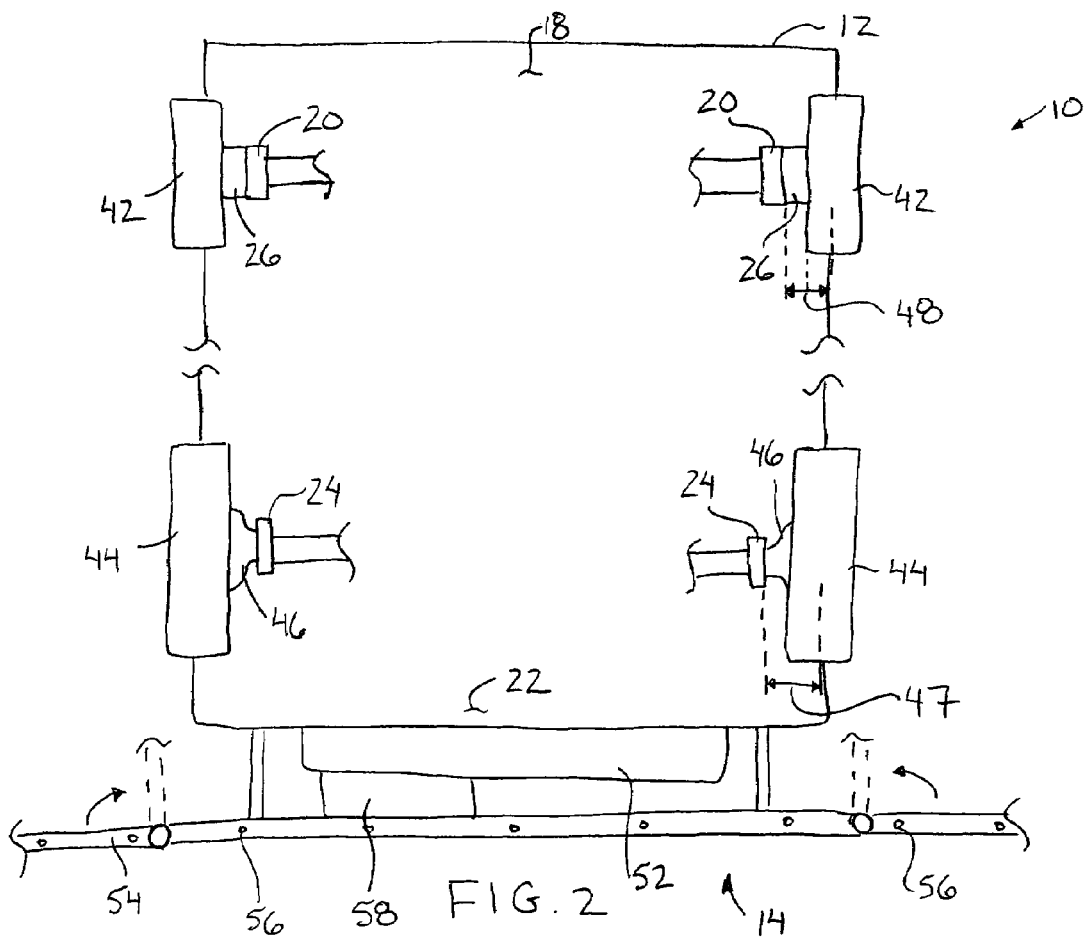
FIG. 2 is a bottom plan view which schematically illustrates the components of the kit.
Figure 3:
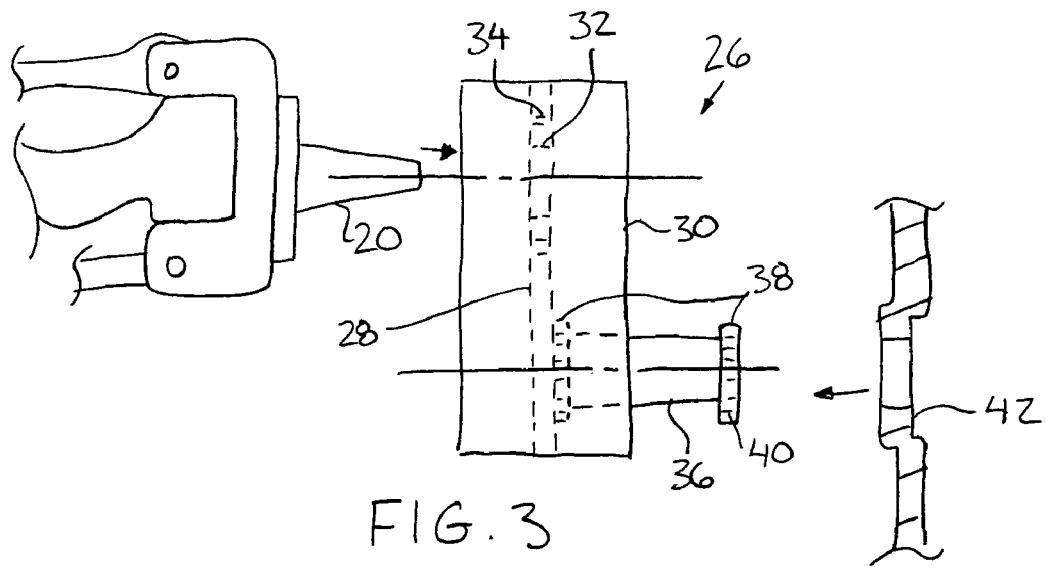
FIG. 3 is an exploded front elevational view of one of the lifting brackets for connection between the existing spindle and the respective front wheel.
Figure 4:
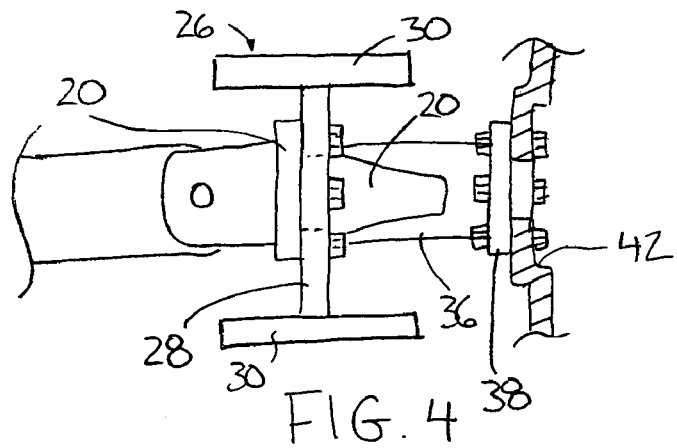
FIG. 4 is a top plan view of one of the lifting brackets in a mounted position.
Figure 5:
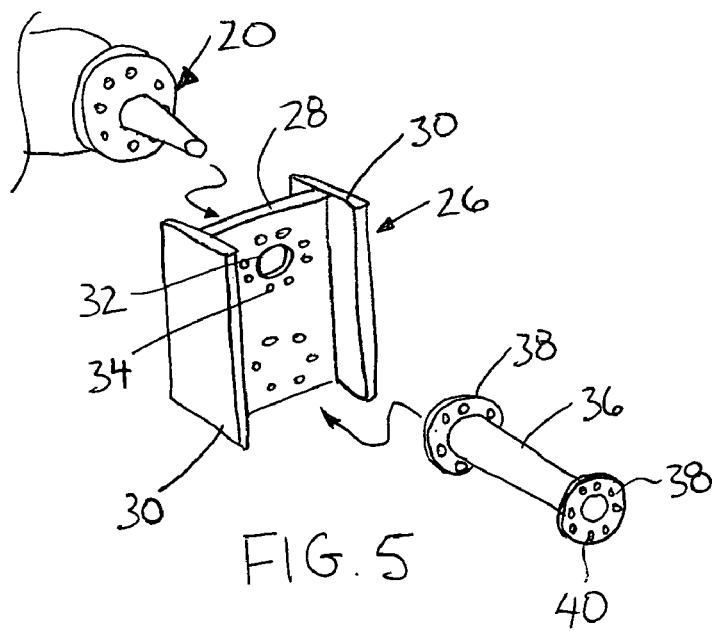
FIG. 5 is an exploded perspective view of one of the lifting brackets.
Figure 6:
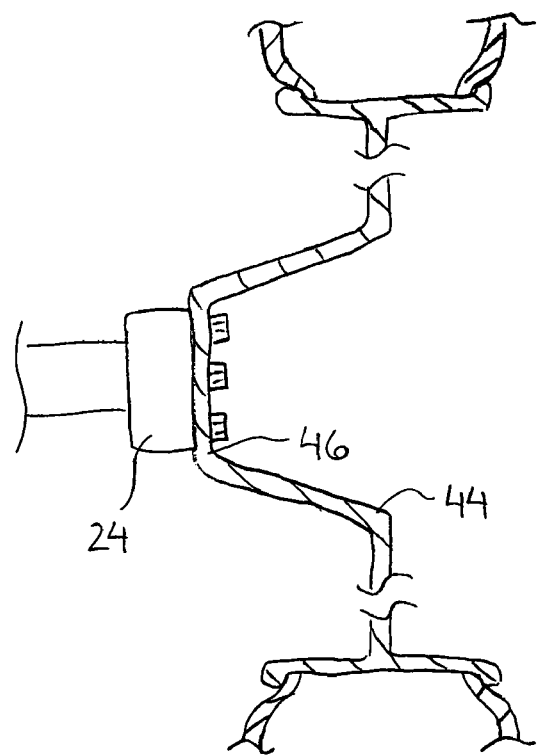
FIG. 6 is a sectional view of one of the replacement rear wheels.
Figure 7:
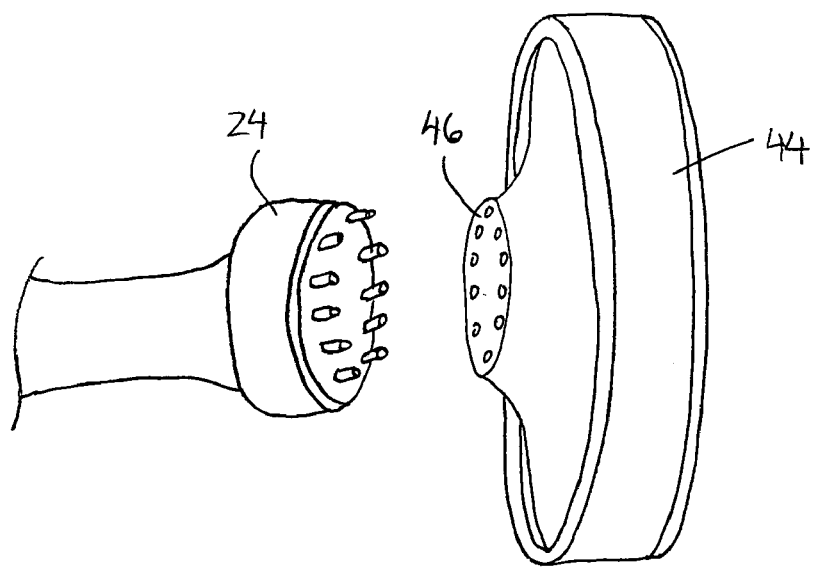
FIG. 7 is an exploded perspective view of the replacement rear wheel.

Referring to the accompanying drawings, there is illustrated a high clearance conversion kit generally indicated at reference numeral 10. The kit 10 is especially useful as a sprayer conversion kit to convert a road vehicle, for example a highway truck tractor 12 into a high clearance agricultural sprayer 14. Though various embodiments of the kit are illustrated in the figures, the common features of the various embodiments will first be described herein.

The truck tractor 12 is supported for rolling movement on the ground on a set of existing wheels 16 before installation of the kit 10 thereon. The existing wheels 16 are supported at a front end 18 of the vehicle on existing spindles 20 which are connected to the existing steering linkage and suspension of the vehicle in a conventional manner. At the rear end 22 of the vehicle the wheels 16 are supported on the existing hubs 24 of the vehicle.

The kit 10 includes a lifting bracket 26 associated with each of the front steerable wheels of the vehicle. Each lifting bracket generally comprises a main plate 28 formed of rigid metal which includes a pair of side plates 30 welded perpendicularly thereto so as to be parallel to one another along opposing side edges of the main plate 28.

A socket 32 is located adjacent a top end of the main plate 28 in the form of a spindle mount comprising an aperture for receiving the existing spindle 20 of the respective front wheel of the vehicle therein. The aperture is circular and surrounded by bolt holes 34 having a pattern that matches the lug nut mounted pattern of the existing spindle for mounting thereon in place of the existing wheel 16 of the vehicle.

The lifting bracket 26 further includes a replacement spindle 36 which is spaced below the socket 32. The replacement spindle 36 generally comprises a tube of rigid metal having a circular bolt flange 38 at each end thereof. At an inner end the bolt flange 38 is fastened to the bracket using suitable fasteners so that the axial direction of the tube projects perpendicularly from the main plate 28 so as to be parallel and spaced below the socket axis. The bolt flange 38 at the outer end of the tube opposite the main plate 28 includes a plurality of bolt apertures 40 which match the lug nut mounting pattern of the lug mounts of a replacement wheel 42 which is larger in diameter than the existing wheel 16. The apertures 40 within the bolt flange 38 are spaced outwardly from the socket in the main plate in a longitudinal and axial direction of the wheel.

Accordingly in order to raise the front end of the vehicle, the existing wheels are removed from the existing spindles to permit the lifting brackets 26 to be mounted on the existing spindles in place of the existing wheels. A replacement wheel 42 is then mounted on the replacement spindle and secured by bolt apertures lying in a plane which is parallel and spaced outwardly from a plane containing the bolt holes 34 of the socket. In this arrangement the replacement wheel supported on the lifting bracket is arranged for movement with the existing spindle relative to the vehicle in the same manner for steering and suspension as before the conversion.

The rear end of the vehicle is raised by providing replacement rear wheels 44 which are larger in diameter than the existing wheels supported on the existing hubs 24. Each of the replacement rear wheels 44 includes a rim with a hub mount 46 formed integrally thereon which is offset in an axial direction of the wheel so as to be spaced inwardly in the axial direction from a centre of the tire supported on the rim. The hub mount includes a series of bolting apertures which match the lug nut mounting pattern of the existing hubs 24 accordingly lifting of the rear end of the vehicle to raise clearance simply involves removing the existing wheels from the existing hubs 24 and mounting the replacement rear wheels 44 in their place.

The offset hub mount of the replacement rear wheels is suitably arranged so that the front and rear wheels of the converted vehicle follow a common travel/drive path. This is ensured by providing a hub mount offset from a centre of the tire of the rear wheels a distance 47 which equals the combined distance 48 of the axial offset between the centre of the tires of the front wheels and the respective bolt apertures for securement to the replacement spindle in addition to the distance between the apertures 40 in the replacement spindle 36 and the apertures of the socket 32.

In order to provide a vehicle which is generally level, rear wheels are provided which are large in diameter than the replacement front wheels but mounted concentrically on the existing hubs 24 as opposed to being offset at the front wheels by the respective lifting brackets 26. The increase in radius between the replacement rear wheels 44 and the existing wheels is equal to the combined increase in radius of the replacement front wheels relative to the existing wheels in addition to the vertical offset between the socket axis and the replacement spindle axis.

When used as a sprayer conversion kit a conventional tank 52, spray boom 54 with spaced nozzles 56 thereon and pump 58 are provided for spraying in a conventional manner.

Turning now to the first embodiment, the front brackets 26 include the main plate 28 and side plates 30 formed in an I-beam construction in cross section. The replacement spindle 36 is secured directly to the main plate 28 spaced below the socket 32 by securing the bolt flange 38 with fasteners onto the main plate 28.

Figure 8:
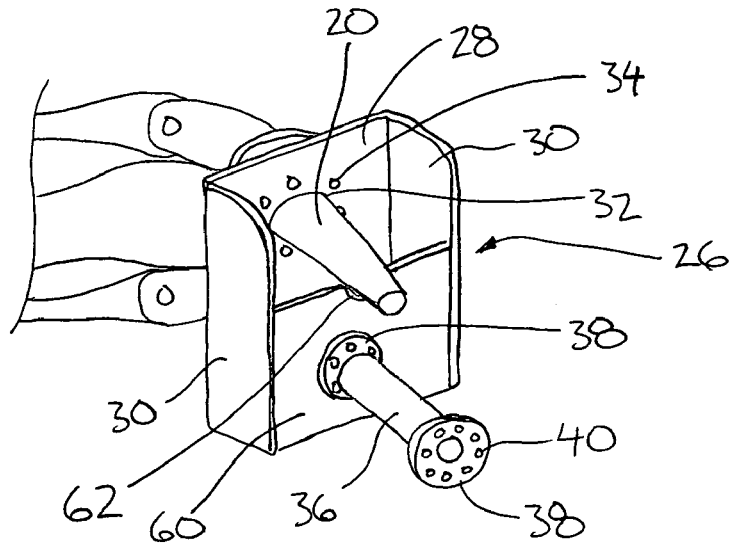
FIG. 8 is a perspective view of a further embodiment of one of the lifting brackets.

As shown in FIG. 8, a variation of the front bracket 26 includes an auxiliary plate 60 which is parallel and spaced apart from the main plate 28 while similarly spanning between the side plates 30. The auxiliary plate 60 includes a cradle 62 concentrically aligned with the socket 32 for supporting the end of the existing spindle 20 received therethrough. The existing spindle may thus be supported at plural axially spaced positions there along for additional structural support. The replacement spindle 36 in this instance is secured to the auxiliary plate 60 spaced below the socket 32 and cradle 62 by securing the bolt flange 38 thereof onto the plate 60 with suitable threaded fasteners.

Figure 9:
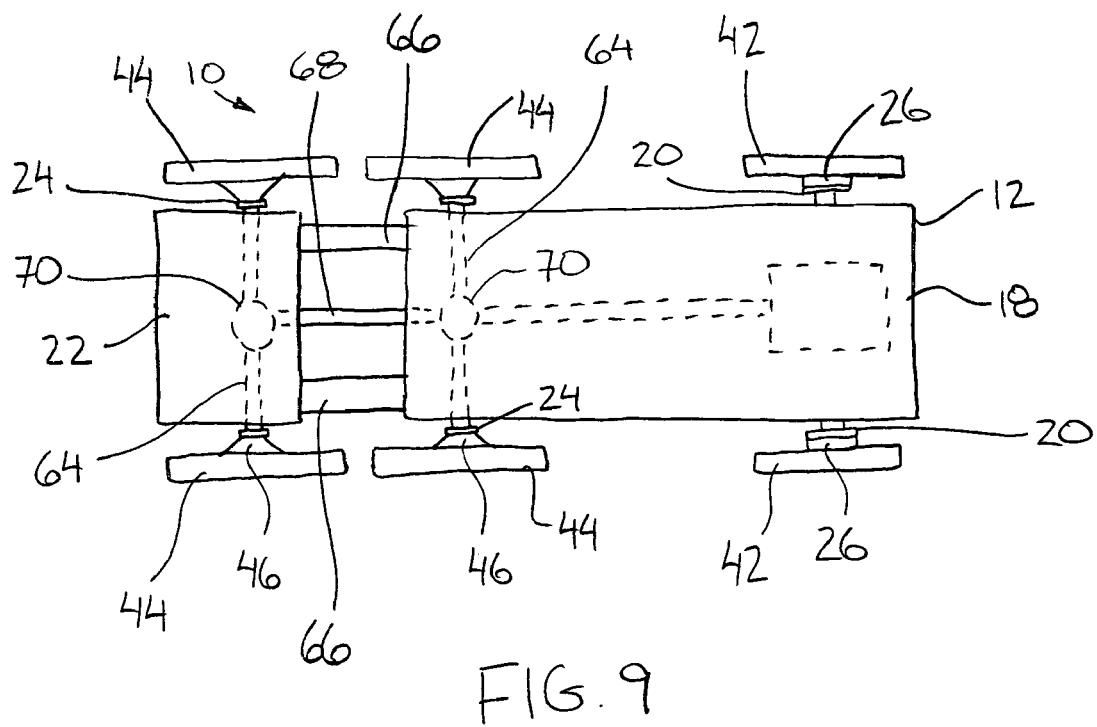
FIG. 9 is a schematic plan view of a further embodiment of the kit shown mounted on a truck having tandem rear axles.

When using the kit for high clearance conversion of a truck having tandem rear axles 64, the first embodiment of the kit as described above can be used for converting a single pair of the existing rear wheels, or as illustrated in FIG. 9, the kit may include a frame extension 66 and a drive extension 68 to replace both pairs of rear wheels with the replacement rear wheels 44 of larger diameter. The frame extension 66 extends the frame in the longitudinal direction of travel between the tandem rear axles 64. The drive extension 68 couples between the differentials 70 of the rear axles 64 respectively to similarly extend the drive in the longitudinal direction between the tandem rear axles 64. Each of the replacement rear wheels 44 in this instance are similarly laterally offset in relation to the existing rear wheels to follow the path of the front wheels after conversion.

While some embodiments of the present invention have been described in the foregoing, it is to be understood that other embodiments are possible within the scope of the invention. The invention is to be considered limited solely by the scope of the appended claims.

The invention claimed is:

1. A high clearance conversion kit in combination with a vehicle arranged to be supported on the ground at a rear end on existing rear wheels and supported at a front end on existing front steerable wheels with each front steerable wheel being supported on an existing wheel spindle of the vehicle and each rear wheel being supported on an existing wheel hub of the vehicle, the kit comprising:
   a rear lifting device supporting the rear end of the vehicle in a raised position in relation to the vehicle being supported on the existing rear wheels on the respective existing wheel hubs;
   a lifting bracket associated with each front steerable wheel and mounted on the existing wheel spindle in place of the associated front steerable wheel so as to be arranged for steering movement with the existing wheel spindle relative to the vehicle;
   each lifting bracket comprising:
      a socket receiving the existing wheel spindle of the respective front steerable wheel therein; and
      a replacement wheel spindle extending outward in an axial direction from an inner end below the respective socket to an outer end spaced outwardly from the respective socket such that the replacement wheel spindle lies parallel and spaced below an axis of the socket; and
   a replacement front wheel mounted on the outer end of the replacement wheel spindle of each lifting bracket opposite the existing wheel spindle such that the replacement wheel mounted on the respective lifting bracket is movable with the existing spindle relative to the vehicle.

2. The kit according to claim 1 wherein the replacement front wheels which are larger in diameter than the existing front steerable wheels.

3. The kit according to claim 2 wherein the rear lifting device includes replacement rear wheels which are larger in diameter than the replacement front wheels for mounting on the respective existing wheel hubs of the vehicle.

4. The kit according to claim 1 wherein the rear lifting device includes replacement rear wheels which are larger in diameter than the existing rear wheels for mounting on the respective existing wheel hubs of the vehicle.

5. The kit according to claim 4 wherein the replacement rear wheels are arranged for direct coupling to the respective existing wheel hubs so as to be arranged for concentric mounting of the replacement rear wheels on the existing wheel hubs.

6. The kit according to claim 4 wherein the replacement rear wheels each include a hub mount spaced inwardly in an axial direction of the respective replacement rear wheel.

7. The kit according to claim 6 wherein the replacement rear wheels each comprise a wheel rim forming the hub mount integrally thereon.

8. The kit according to claim 1 wherein the vehicle comprises a truck tractor in which the existing rear wheels are tandem rear wheels, the kit including a frame extension arranged for extending the frame between the existing rear wheels and replacement rear wheels which are larger in diameter than the existing rear wheels.

9. The kit according to claim 1 further comprising a sprayer conversion kit including a boom with sprayer nozzles spaced thereon and arranged for being supported on the vehicle and a tank for supplying the sprayer nozzles.

10. The kit according to claim 1 wherein the vehicle comprises a highway truck tractor.

11. A method for conversion of a vehicle to a high clearance vehicle, the vehicle being supported on the ground at a rear end on existing rear wheels and supported at a front end on existing front steerable wheels, each front steerable wheel being supported on an existing wheel spindle of the vehicle and each rear wheel being supported on an existing wheel hub of the vehicle, the method comprising:
   supporting the rear end of the vehicle in a raised position in relation to the vehicle being supported on the existing rear wheels on the respective existing wheel hubs;
   providing a lifting bracket associated with each front steerable wheel, the each lifting bracket comprising:
      a socket arranged for receiving the existing wheel spindle of the respective front steerable wheel therein; and
      a replacement wheel spindle extending outward in an axial direction from an inner end below the respective socket to an outer end spaced outwardly from the respective socket such that the replacement wheel spindle lies parallel and spaced below an axis of the socket;
   mounting each lifting bracket on the respective existing wheel spindle in place of the associated front steerable wheel by mounting each socket on the respective existing wheel spindle such that the lifting bracket is arranged for steering movement with the existing wheel spindle relative to the vehicle; and
   supporting each existing wheel spindle on the lifting bracket at the socket and at an end of the existing wheel spindle such that the existing wheel spindle is supported on the lifting bracket at a plurality of positions spaced axially along the existing wheel spindle;
   mounting a front wheel on the outer end of the each replacement wheel spindle of each bracket for rotation about a respective wheel axis lying parallel and spaced below the respective existing wheel spindle such that the front wheel is movable with the existing spindle relative to the vehicle.

12. The method according to claim 11 wherein the front wheels comprise replacement front wheels which are larger in diameter than the existing front steerable wheels.

13. The method according to claim 12 including supporting the rear end of the vehicle in a raised position by providing replacement rear wheels which are larger in diameter than the replacement front wheels for mounting on the respective existing wheel hubs of the vehicle.

14. The method according to claim 11 including supporting the rear end of the vehicle in a raised position by providing replacement rear wheels which are larger in diameter than the existing rear wheels for mounting on the respective existing wheel hubs of the vehicle.

15. The method according to claim 14 including coupling the replacement rear wheels concentrically on the existing wheel hubs.

16. The method according to claim 15 wherein the replacement rear wheels each include a hub mount spaced inwardly in an axial direction of the respective replacement rear wheel.

17. The method according to claim 16 wherein the replacement rear wheels each comprise a wheel rim forming the hub mount integrally thereon.

18. The method according to claim 11 for conversion of a truck tractor, in which the existing rear wheels are tandem rear wheels, into a high clearance vehicle, the method including extending the frame between the rear wheels and replacing the existing rear wheels with replacement rear wheels which are larger in diameter than the existing rear wheels.

19. The method according to claim 11 further comprising supporting a boom with sprayer nozzles spaced thereon on the vehicle and supporting a tank for supplying the sprayer nozzles on the vehicle.

20. The method according to claim 11 wherein the vehicle comprises a highway truck tractor.

* * * * *